Dec. 4, 1956   R. S. THATCHER   2,772,607
APPARATUS FOR MAKING FILTERS
Filed July 19, 1954   6 Sheets-Sheet 3

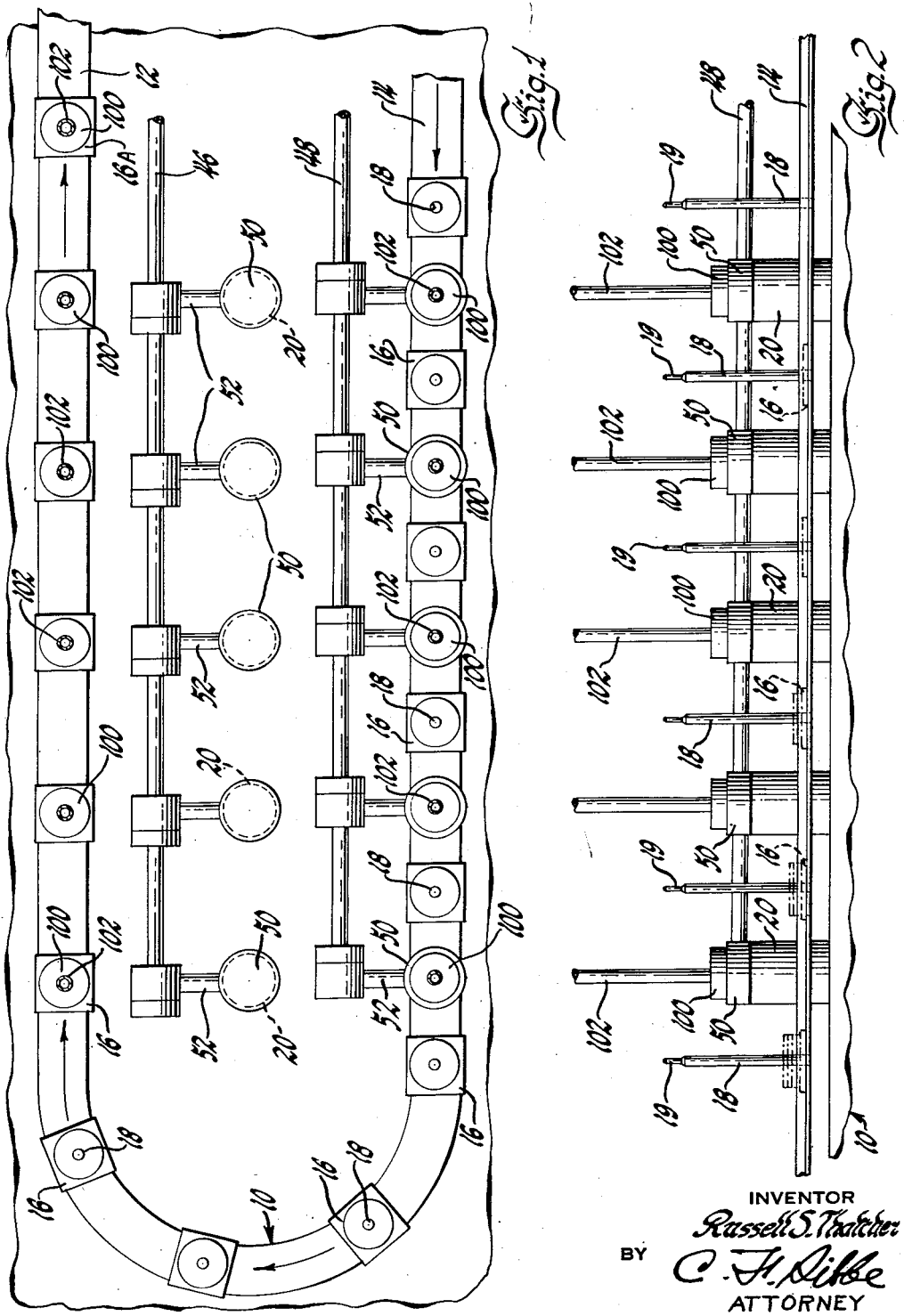

INVENTOR
Russell S. Thatcher
BY
C. F. Dibble
ATTORNEY

Dec. 4, 1956  R. S. THATCHER  2,772,607
APPARATUS FOR MAKING FILTERS
Filed July 19, 1954  6 Sheets-Sheet 4
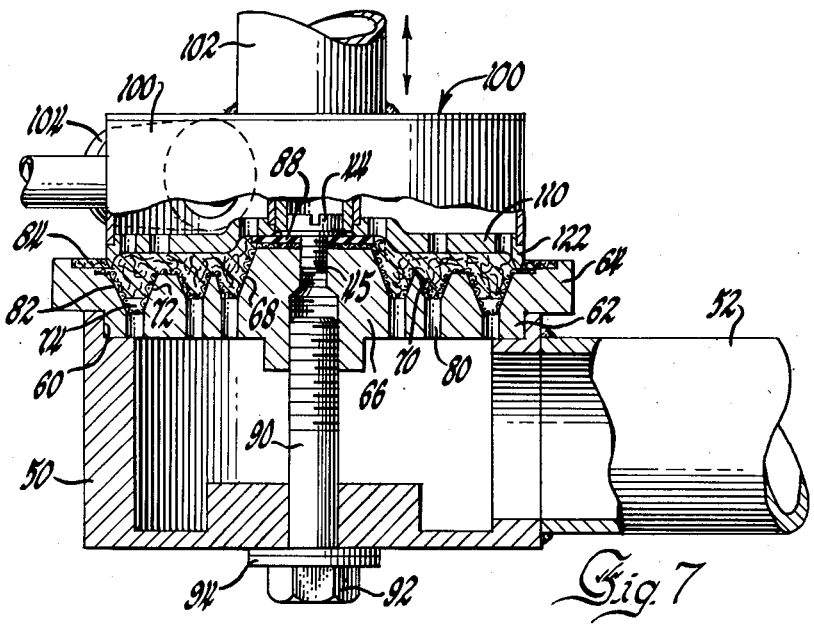
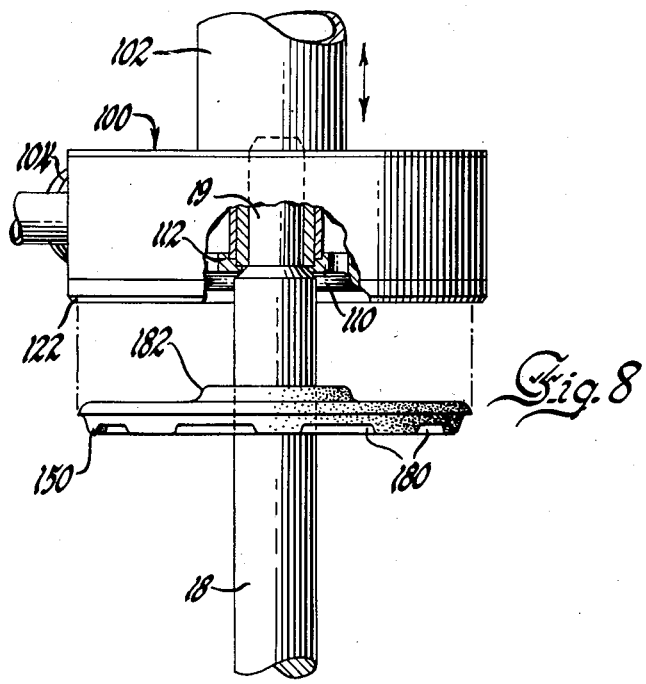
INVENTOR
Russell S. Thatcher
BY C. H. Diebe
ATTORNEY

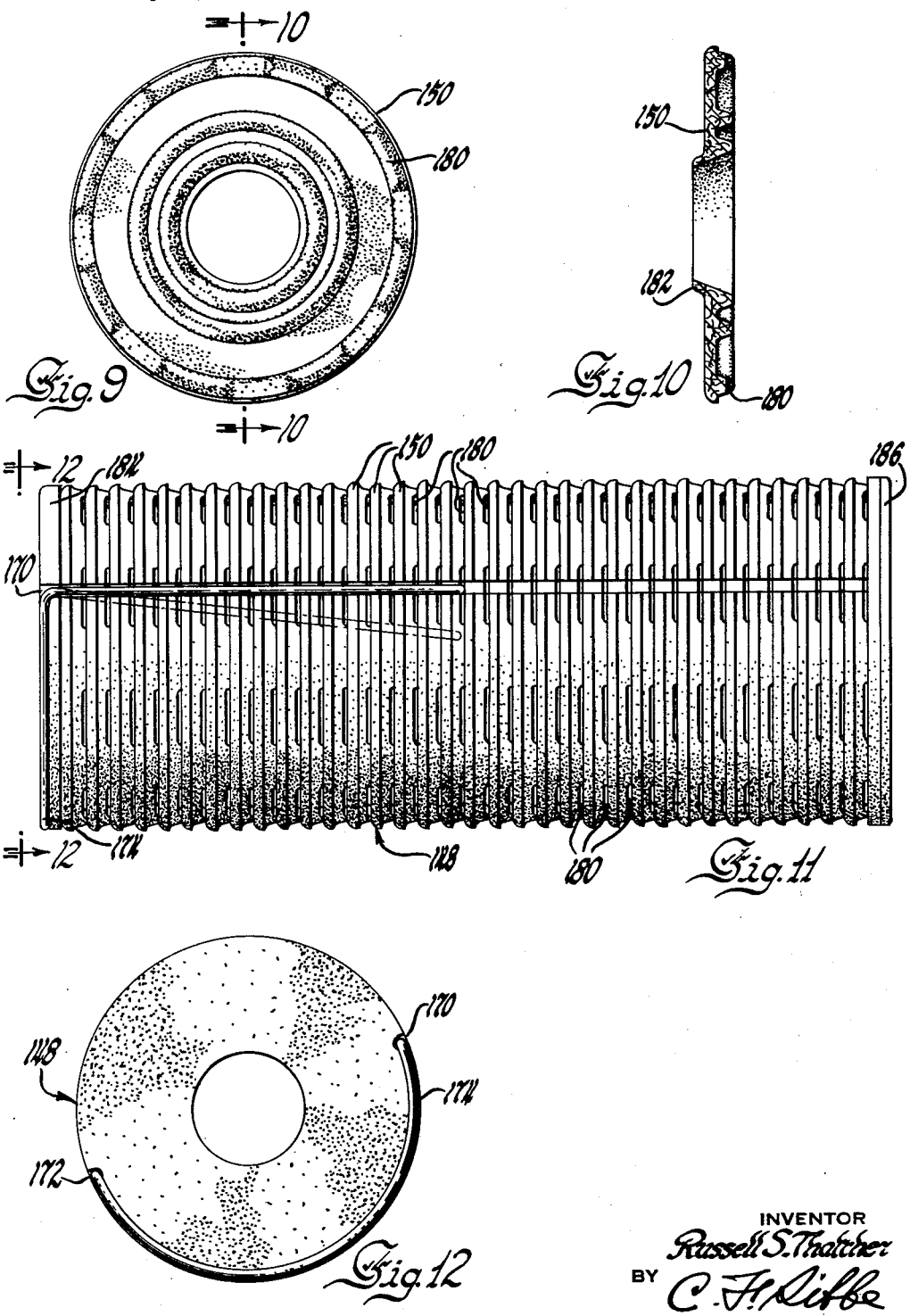

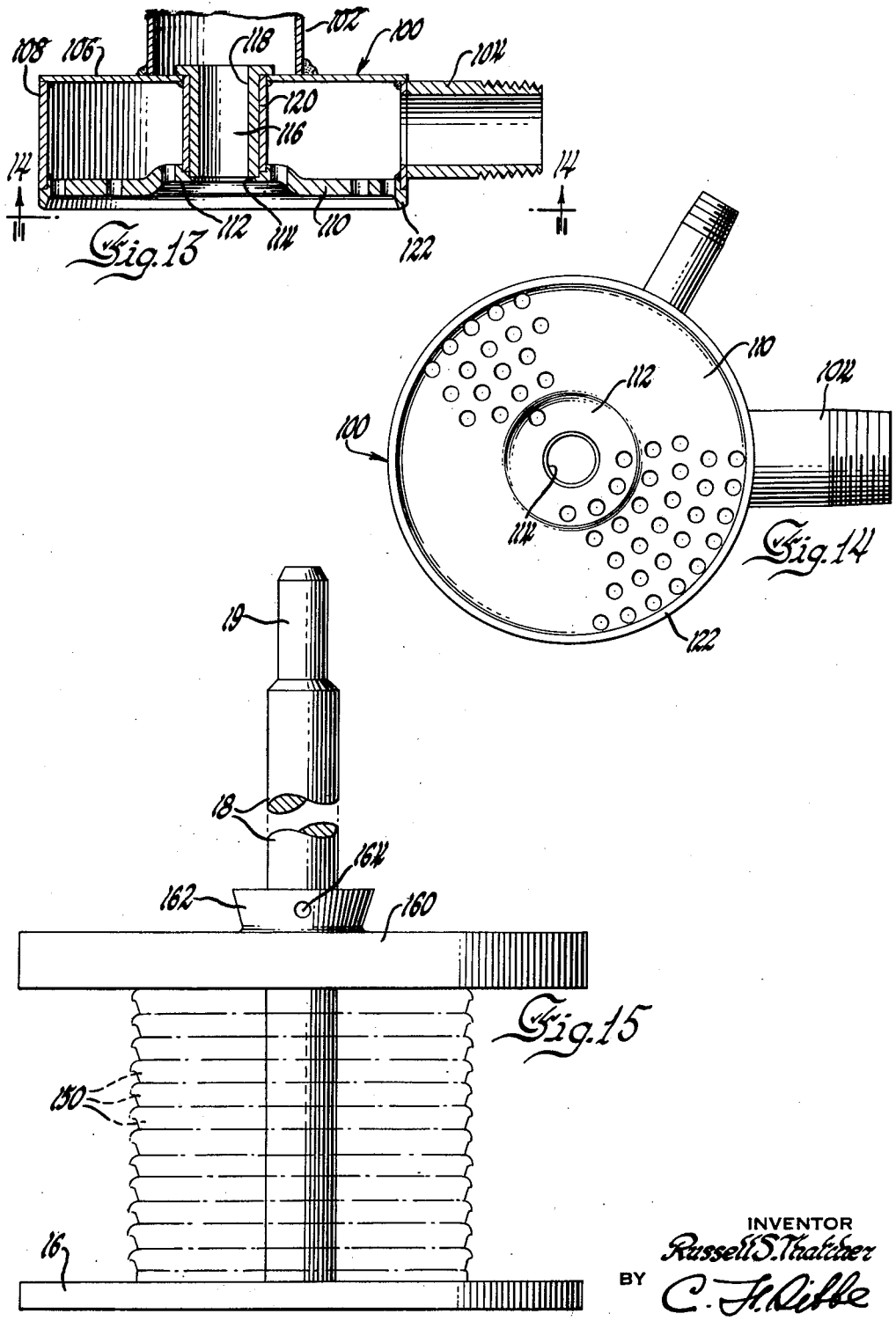

United States Patent Office 2,772,607
Patented Dec. 4, 1956

2,772,607

APPARATUS FOR MAKING FILTERS

Russell S. Thatcher, Camden, Tex., assignor to General Motors Corporation, Detroit, Mich., a corporation of Delaware Application July 19, 1954, Serial No. 444,034

4 Claims. (Cl. 92—54)

This invention relates to filters for removing foreign matter or particles from liquids and more particularly to apparatus for making filters including filter elements comprising multiple plaques or discs of accreted porous material arranged in stack form.

In providing filter units of maximum capacity with minimum volume and which are effective for removing foreign particles from liquids such as oil, it is desirable that the replaceable filter elements be low in cost, homogeneous in structure where desirable, alterable in density of structure at localized areas so that structural strength will be adequate for whatever design of filter or field of service is selected and also to withstand a wide range of fluid pressure without rupture.

An object of the present invention is to provide an improved apparatus for making filter elements employing low cost filter element material which may be formed to suit a wide range of filtering conditions.

To these ends, an important feature of the invention resides in apparatus for making stacks of accreted filter plaques or discs having channels separating them and each plaque being of one-piece construction.

Other features of the invention reside in an apparatus for forming individual one-piece filter plaques and joining a number of such plaques into a unitary stack.

In the drawings:

Fig. 1 is a plan view showing a diagrammatic representation of apparatus by means of which the articles and method of this invention may be realized;

Fig. 2 is a view in elevation of the apparatus shown in Fig. 1;

Fig. 7 is an elevation view of one of the devices shown in Fig. 5 and one shown in Figs. 1, 2, 3 and 4, a portion of the view being in section better to illustrate the operation;

Fig. 8 is an elevational view of one device shown in Fig. 7 and a mandrel as shown in Figs. 1 to 4 with a portion being broken away for clarity of illustration;

Fig. 9 is a plan view of an accreted one-piece plaque or disc;

Fig. 10 is a sectional view taken along the line 10—10 of Fig. 9;

Fig. 11 is an elevational view of a stack of elements such as shown in Fig. 9 with end plates and a bail added;

Fig. 12 is an end view of the stack shown in Fig. 11 looking in the direction of the arrows 12—12;

Fig. 13 is a sectional view of one device shown in Figs. 1, 7 and 8;

Fig. 14 is a view of the device shown in Fig. 13 and looking in the direction of the arrows 14—14; and Fig. 15 is an elevational view of a stack of filter plaques as formed on the apparatus of Fig. 1.

Figure 3:
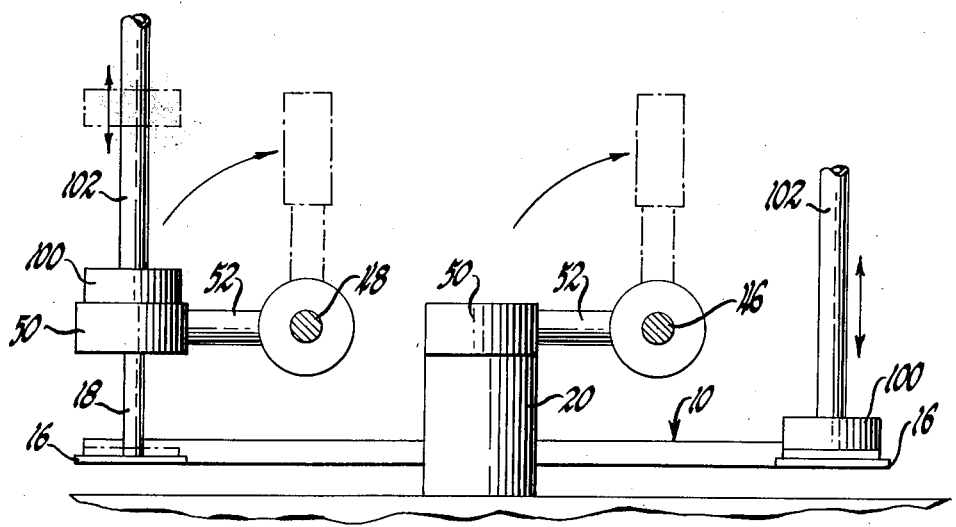
Fig. 3 is a diagrammatic representation of a portion of the apparatus shown in Figs. 1 and 2 and depicting certain stages of operation.

In the diagrammatic representations of Figs. 1 to 4, inclusive, a continuous conveyor 10 is represented as having two parallel runs 12 and 14. This conveyor may be of conventional construction and may be in the form of a belt or be of chain link manufacture. Mounted on the conveyor is a series of spaced platforms 16 each of which supports a vertical spindle 18. Each spindle has a reduced upper end portion 19. Means, not shown, are provided for intermittently operating the conveyor 10 in the direction shown by the arrows in Fig. 1.

Intermediate and parallel with the two runs 12 and 14 is placed a series of containers 20 adapted to hold a fibrous pulp slurry. Each of these containers is provided with an inlet nipple 22 (Fig. 5) through which that container is kept filled with a fibrous pulp slurry 24 of a nature to be described hereinafter. The upper interior portion of each container 20 is interiorly fitted with a circular disc 26 having an annular rib 28 resting on the top edge of the container 20 and radial arms 30 joined to a hub portion 32. Three upwardly extending pilot members 34 are joined in evenly spaced relation to the outside wall of each container 20 by means of bolts 36. The hub 32 is bored centrally to receive one end of a vertical rod 40 which comprises a stiffening member for the container 20. The upper end of the rod 40 is recessed as at 42 loosely to receive the head 44 of a screw 45 as will further appear.

Figure 4:
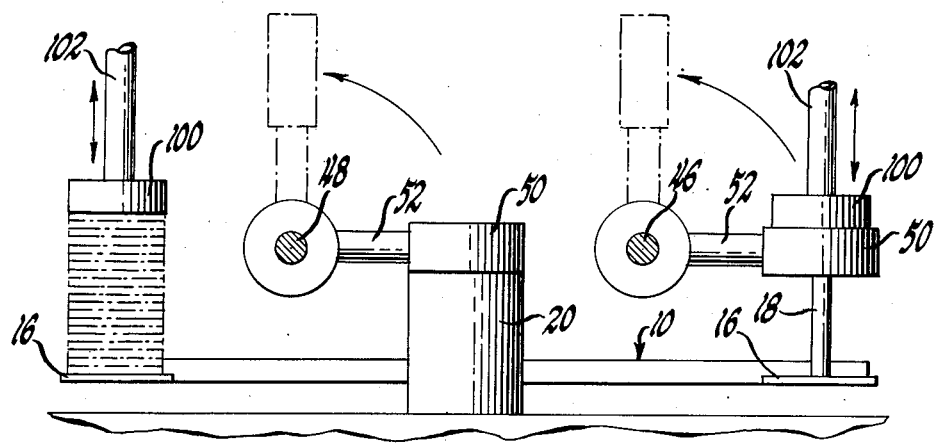
Fig. 4 is a view similar to that of Fig. 3 but depicting a different and later stage during the operative steps of the method.

Intermediate each conveyor run 12 or 14 and the row of containers 20 is located a shaft 46 or 48. These shafts may simultaneously be rotated in either direction as shown in Figs. 3 and 4 through arcs of susbtantially 180° around their own axes by power means not shown and in alternate timed sequence with the intermittent travel of the conveyor 10.

A series of suction cups 50 is mounted for rotation with each shaft 46 or 48 and each cup is attached to its shaft by means of a short tube 52 which conveniently, but not necessarily, may provide a passage 54 (Fig. 5) for drawing air from or producing a vacuum in the corresponding cup 50. Each cup 50 is also provided with a smaller inlet 56 to which a conduit, not shown, communicates for admitting compressed air to the cup. It will be appreciated that flow through both passages 54 and 56 is controlled by valves not shown.

Each cup 50 is cylindrical with one end thereof being recessed as at 60 for the reception of an annular portion 62 of a mold device 64. The latter element is annular in configuration with its exterior dimension such that it will fit within and be guided in vertical motion by the pilot members 34. The mold member 64 is provided with a hub 66 and three annular channels 68, 70 and 72 which are concentric with the hub 66. The outer channel 72 is partially broken by spaced axial ridges 74. Each of these ridges is approximately one half the depth of the channel. The arcuate length of each ridge 74 is made approximately the same as the distance between adjacent ridges. Leading through the mold device 64 and communicating with each of the annular grooves 68, 70 and 72 are three annular series of holes 80. A metallic screen 82 is made permanently to conform with the mold member 64 and closely to contact the inclined walls of the annular grooves and the one flat end of the hub 66. The outer annular margin of the screen 82 is held in place by means of a resilient washer 84 and the latter is held in place by means not shown. The central portion of the screen 82 is retained in position on the mold device 64 by means of the screw head 44 and interposed between the screw head 44 and the screen is a resilient washer 88. The hub 66 is threaded to receive the screw 45 and also the threaded end of a bolt 90, the head 92 of which bears against the outside of the cup 50 with two washers 94 interposed. As will be understood, the bolt 90 serves to hold the mold device 64 firmly in place on the cup 50.

Mounted above each run 12 and 14 of the conveyor 10 is a series of vertically reciprocable pneumatic cups 100, each of which is supported by a suction tube 102. Each cup 100 is also provided with a compressed air inlet tube 104. Fig. 13 shows the internal construction of each cup 100 which comprises a top plate 106, a cylindrical wall 108 and a perforated bottom plate 110. A central portion 112 of the plate 110 bears a central opening 114 and is set inwardly a slight extent. This central portion is slightly larger in diameter than is the resilient washer 88 of the mold device. A passage 116 leads through the cup 100 and is defined by a flanged tube 118 and a coaxial sleeve 120 which is welded and made integral with the cup. The margin of the disc 110 is formed in the shape of a beveled rim 122.

Fig. 11 shows a completed filter element 148 made up as an integral stack of plaques such as the plaque 150 shown in Figs. 9 and 10. In making the filter element, each of the housings 20 is maintained full of slurry. A convenient and satisfactory slurry has been found to be mostly water and containing about 2.6 percent solid matter comprising 60 percent jack pine fiber and 40 percent ground newsprint. An uncured heater addition phenolic resin added to the slurry is conveniently 30 percent of the combined weight of jack pine fiber, newsprint and resin. 70 percent of the total solid matter in the slurry is fibrous material and 30 percent is resin by solid weight. The addition of the resin increases the total solids in the slurry to the 2.6 percent above referred to.

In maintaining each container 20 almost full of slurry, the latter is drawn from a larger container or source of supply, not shown, and the flow to the containers 20 is regulated by a conventional constant level regulating device.

Figure 5:
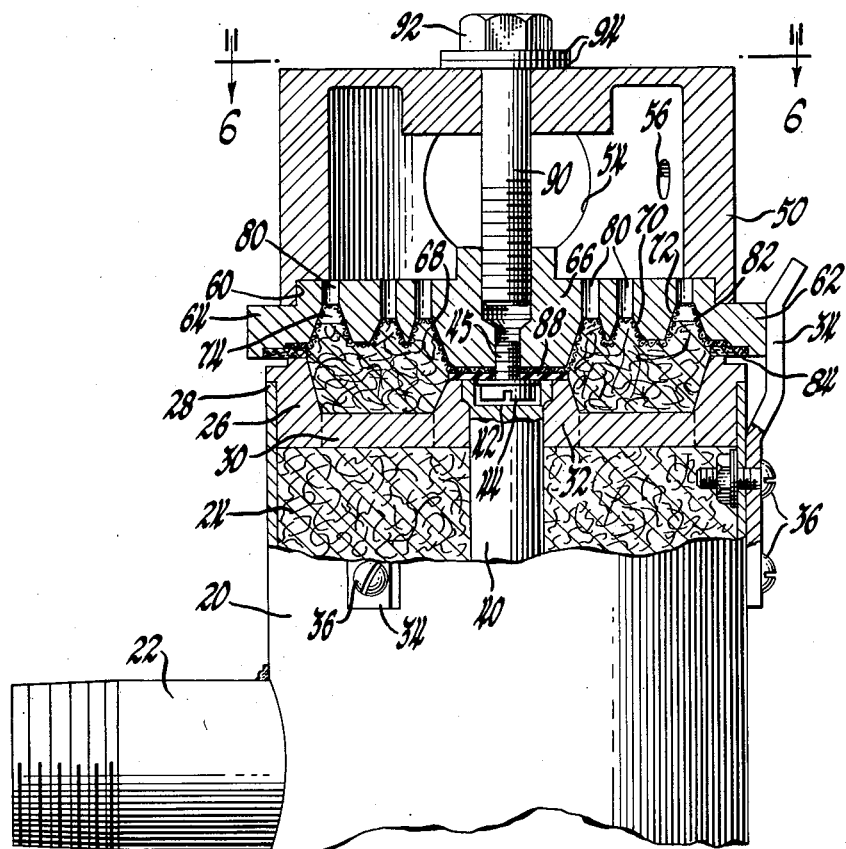
Fig. 5 is an enlarged elevational view of some details of construction of two of the devices shown in Fig. 1 with parts of the apparatus being shown in section for clarity of illustration.
Figure 6:
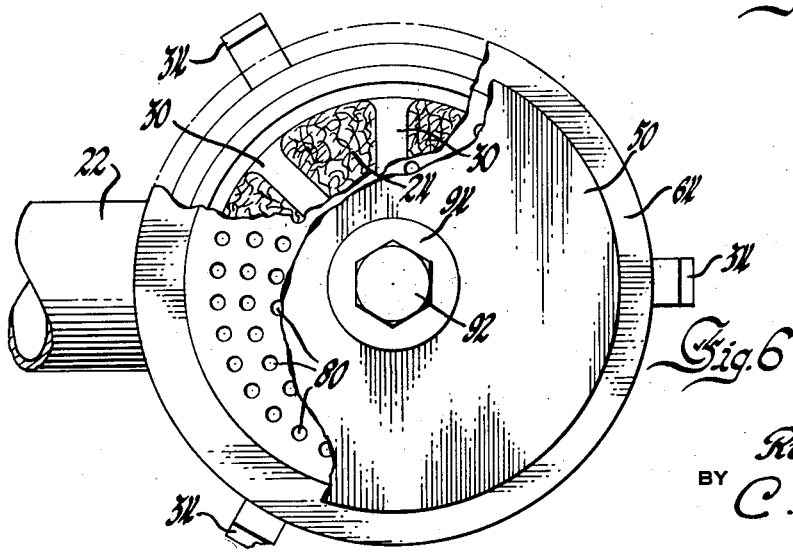
Fig. 6 is a view looking in the direction of the arrows 6—6 in Fig. 5 with parts broken away to show the interior construction.

With each cycle of motion of shafts 46 and 48, five individual plaques 150 are made and deposited on the platforms 16 of the conveyor 10, while five plaques are being accreted from the containers 20. In Fig. 3, plaques are being placed on the left run whereas in Fig. 4 the plaques are being placed on the right run. Considering only the making of one plaque 150, it will be seen that a shaft 46 or 48 is so rotated as to bring one of the suction cups 50 attached thereto into tight engagement with the top of a container 20 so that the parts are in relative and mated position as shown in Fig. 5. Air is then drawn out through the passage 54 by suitable operation of valves, not shown, and the resultant suction causes a layer of fibrous material to accrete upon the screen 82 and this layer is built up to a substantial and predetermined thickness requisite for a plaque. The moist plaque adheres to the screen and conforms with the annular and radial ridges thereof. Inherently, the process results in a fairly smooth under surface on the plaque. When the desired thickness has been achieved after a very short interval of time, the shaft 46 or 48 is rotated 180° so that the accreted plaque will be presented in the position as shown in Fig. 7. During arcuate movement of the plaque it becomes sufficiently dry to become a unitary structure although it remains moldable and subsequent lowering of a pneumatic cup 100 into contact with the plaque, as shown in Fig. 7, compacts and molds one surface of the plaque and permits removal of the latter from the screen 82 by introduction of a vacuum or suction through the vertical tube 102. The plate 110 is so shaped as to assure proper configuration of the plaque. The cup 100 is then raised sufficiently to clear the cup 50 as the latter is rotated 180° back into its original position over a container 20 and then the pneumatic cup 100 is again lowered. In the meanwhile the conveyor 10 has advanced a step so that a spindle 18 will vertically register with the cup 100. When this occurs, the cup 100 is lowered to seat on the reduced portion 19 of the spindle and air pressure is introduced through the pipe inlet 104. The completed individual plaque 150 is discharged by the air and placed or dropped in position upon the mandrel 18 as depicted in Fig. 8. The pneumatic cup 100 is again raised to be in position to lower, engage and unload the cup 50 in the next cycle of operation.

It will be seen that when a given mandrel has passed along two runs 12 and 14, it will have acquired ten plaques in the form of a stack. The apparatus may be so formed as to make any number of plaques for each stack. When the stack has reached the position as shown by the platform 16A, as shown in Fig. 1, a heavy disc 160 (Fig. 15) is placed on the mandrel to hold the plaques together with a predetermined endwise pressure. If desired, the weight 160 may be provided with a hub 162 drilled at 164 for reception of a pin definitely to hold the weight 160 at a required distance from the platform 16 as a preliminary to placing the stack into a heated chamber for curing the resin therein. The conveyor 10 may be continued to carry the assembled stacks in sequence into and through the heated or curing chamber.

The weight 160 is made sufficient somewhat to densify the ridges and localized areas of the plaques without diminishing the porosity of substantial portions thereof.

Curing of the resin in the stack 148 serves to strengthen the completed element and to cause the discs firmly to adhere to each other to give an integrated structure. Care should be exercised, however, not to use too much resin or to apply too much pressure as either would reduce porosity of the filtering material to an undesirable extent.

Diametrically opposed and along the sides of the completed stack two grooves 170 and 172 (Fig. 12) are formed to accommodate opposite ends of a wire bail member 174. This member is originally formed, as partially shown in dot-and-dash lines in Fig. 11, so that when it is placed on the assembly, it will be held frictionally in place. When removing the filter element from a filter housing as a preliminary to replacement, the loop portion may easily be pried up and serve in lifting the element.

It will be noted that the radial ridges 74 in the mold device 64 produce radial passages 180 in each plaque 150 so that fluid access may be had to the interior areas of the adjacent plaques. Each plaque is so formed as to provide a central hub 182 which is adapted to nest with adjacent plaques and form a central passage extending through the length of the stack. Ordinarily, but not necessarily, such passage will serve to conduct filtered fluid.

Fig. 11 shows the stack 148 as comprising a large number of plaques 150 with the end plaques 184 and 186 being somewhat modified to present outer smooth end surfaces. These end plaques may be made in any required form by suitably modifying the mold device which is to cooperate with the first and last plaque receiving platform 16 on the conveyor 10.

I claim:

1. Apparatus for forming stacks of accreted plaques comprising a conveyor, a series of vertical mandrels arranged along and in spaced relation on said conveyor, a series of containers arranged along and to one side of said conveyor, a series of suction cups each pivotally mounted alternately to register with one of said containers and a space intermediate adjacent mandrels in timed sequence with movement of said conveyor, pneumatic operative means associated with said conveyor for alternately removing accreted plaques from said cups and depositing them on said mandrels, and means connected with said suction cups for applying suction to the latter when positioned over said containers.

2. Apparatus for forming stacks of accreted plaques comprising two conveyor runs, a series of mandrels arranged in spaced relation on each of said conveyor runs, a series of containers arranged along and between said conveyor runs, a series of suction cups, each of said cups being pivotally mounted alternately to register with a space between adjacent mandrels on one of said conveyor runs and with one of said containers, pneumatic operative means above each of said conveyor runs for alternately removing accreted plaques from each of the said cups when in said space and depositing them on one of said mandrels, and means connected with said suction cups for applying suction to the latter when positioned over said containers.

3. Apparatus for forming stacks of accreted filter plaques comprising two parallel conveyor runs, spaced mandrels on each of said runs, a series of containers arranged along and between said runs, a shaft rotatably mounted and extending along and between each of said conveyor runs and said series of containers, two series of suction cups adapted to register alternately with said containers and said conveyor runs, each of said suction cups being arranged to rotate around one of said shafts, and pneumatic means over each conveyor run for removing plaques from one of the said suction cup series and depositing them on said mandrels.

4. Apparatus for forming stacks of accreted filter plaques comprising a conveyor, spaced mandrels arranged in series on said conveyor, a series of containers for slurry arranged in parallel relation to said spaced mandrels, a shaft extending along and between said conveyor and said container series, suction cups arranged to rotate around said shaft alternately to register with said containers and spaces between said mandrels, means over said conveyor for removing an accreted plaque from one of said cups and depositing it on one of said mandrels, and the conveyor and cups being arranged for movement in timed sequence.

References Cited in the file of this patent

UNITED STATES PATENTS

| | | |
|---|---|---|
| 740,023 | Keyes | Sept. 29, 1903 |
| 2,388,828 | Chaplin | Nov. 13, 1945 |
| 2,395,301 | Sloan | Feb. 19, 1946 |
| 2,553,820 | Gunn | May 22, 1951 |
| 2,601,521 | Heftler | June 24, 1952 |
| 2,681,599 | Palese et al. | June 22, 1954 |